US010581834B2

(12) United States Patent
Ganesan (10) Patent No.: US 10,581,834 B2
(45) Date of Patent: Mar. 3, 2020

(54) ENHANCING TRANSACTION AUTHENTICATION WITH PRIVACY AND SECURITY ENHANCED INTERNET GEOLOCATION AND PROXIMITY

(71) Applicant: Early Warning Services, LLC, Scottsdale, AZ (US)

(72) Inventor: Ravi Ganesan, San Diego, CA (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 105 days.

(21) Appl. No.: 15/422,137

(22) Filed: Feb. 1, 2017

(65) Prior Publication Data

US 2017/0149769 A1 May 25, 2017

Related U.S. Application Data

(63) Continuation-in-part of application No. 15/015,592, filed on Feb. 4, 2016, now Pat. No. 10,284,549, which is a continuation of application No. 14/330,025, filed on Jul. 14, 2014, now Pat. No. 9,325,702, which is a continuation-in-part of application No. 13/736,944, filed on Jan. 9, 2013, which is a continuation-in-part (Continued)

(51) Int. Cl.
*H04L 29/06* (2006.01)
*G06F 21/31* (2013.01)

(52) U.S. Cl.
CPC .......... *H04L 63/0838* (2013.01); *G06F 21/31* (2013.01); *G06F 2221/2111* (2013.01); *H04L 63/18* (2013.01)

(58) Field of Classification Search
CPC ... H04L 63/0838; H04L 67/18; H04L 61/609; G06Q 20/02
USPC ........ 709/208, 223, 245, 228; 726/5, 6, 7, 9, 726/28; 705/44
See application file for complete search history.

(56) References Cited

U.S. PATENT DOCUMENTS

| 5,874,918 A | 2/1999 | Czamecki et al. |
| 5,930,474 A | 7/1999 | Dunworth et al. |

(Continued)

FOREIGN PATENT DOCUMENTS

| EP | 1936528 A1 | 6/2008 |
| JP | H11-338933 A | 12/1999 |

(Continued)

OTHER PUBLICATIONS

Non-Final Office Action dated Jun. 12, 2017 for U.S. Appl. No. 15/015,592; all pages.

(Continued)

*Primary Examiner* — James N Fiorillo
(74) *Attorney, Agent, or Firm* — Kilpatrick Townsend & Stockton LLP (57) ABSTRACT

Transaction authentication with techniques and geolocation are combined to provide privacy and security enhanced geolocation. In an example implementation, a user initiates a transaction at a web service which in turns triggers a security server. The security server uses its always on connection with the combined client on user security device to perform geolocation, proximity and transaction authentication. These results may be used by the web service to make a decision on whether to proceed with the transaction.

18 Claims, 7 Drawing Sheets

Related U.S. Application Data of application No. 13/669,123, filed on Nov. 5, 2012, now Pat. No. 8,589,459, which is a continuation of application No. 13/011,739, filed on Jan. 21, 2011, now Pat. No. 8,806,592, which is a continuation-in-part of application No. 13/011,587, filed on Jan. 21, 2011, now Pat. No. 8,789,153, which is a continuation of application No. 12/938,245, filed on Nov. 2, 2010, now Pat. No. 8,341,236.

(60) Provisional application No. 61/298,551, filed on Jan. 27, 2010, provisional application No. 61/257,190, filed on Nov. 2, 2009.

(56) References Cited

U.S. PATENT DOCUMENTS

| | | |
|---|---|---|
| 6,151,631 A | 11/2000 | Ansell et al. |
| 6,249,252 B1 | 6/2001 | Dupray |
| 6,684,250 B2 | 1/2004 | Anderson et al. |
| 6,748,367 B1 | 6/2004 | Lee |
| 6,757,740 B1 | 6/2004 | Parekh et al. |
| 6,769,030 B1 | 7/2004 | Bournas |
| 6,947,978 B2 | 9/2005 | Huffman et al. |
| 6,968,194 B2 | 11/2005 | Aljadeff et al. |
| 7,100,204 B1 | 8/2006 | Myllymaki et al. |
| 7,194,354 B1 | 3/2007 | Oran et al. |
| 7,657,522 B1 | 2/2010 | Puzicha et al. |
| 8,136,148 B1 | 3/2012 | Chayanam et al. |
| 8,341,236 B1 | 12/2012 | Ganesan |
| 8,364,758 B2 | 1/2013 | Hydrie et al. |
| 8,438,382 B2 | 5/2013 | Ferg |
| 8,490,168 B1 | 7/2013 | Holloway et al. |
| 8,549,601 B2 | 10/2013 | Ganesan |
| 8,589,459 B1 | 11/2013 | Ganesan |
| 8,589,532 B2 | 11/2013 | Tenny et al. |
| 8,789,153 B2 | 7/2014 | Ganesan |
| 8,806,592 B2 | 8/2014 | Ganesan |
| 9,325,702 B2 | 4/2016 | Ganesan |
| 2002/0049644 A1* | 4/2002 | Kargman ............... G06Q 20/20 705/26.1 |
| 2002/0069037 A1 | 6/2002 | Hendrickson et al. |
| 2002/0095507 A1 | 7/2002 | Jerdonek |
| 2003/0028451 A1 | 2/2003 | Ananian |
| 2003/0092421 A1 | 5/2003 | Dolwin |
| 2003/0093341 A1 | 5/2003 | Millard et al. |
| 2004/0030934 A1 | 2/2004 | Mizoguchi et al. |
| 2004/0210536 A1 | 10/2004 | Gudelj et al. |
| 2004/0225878 A1 | 11/2004 | Costa-Requen et al. |
| 2004/0242238 A1 | 12/2004 | Wang et al. |
| 2005/0018611 A1 | 1/2005 | Chan et al. |
| 2005/0071417 A1 | 1/2005 | Taylor et al. |
| 2005/0135242 A1 | 5/2005 | Larsen et al. |
| 2005/0172229 A1 | 8/2005 | Reno et al. |
| 2005/0254653 A1 | 11/2005 | Potashnik et al. |
| 2006/0168259 A1 | 7/2006 | Spilotro |
| 2006/0168663 A1 | 7/2006 | Viljoen et al. |
| 2006/0206709 A1 | 9/2006 | Labrou et al. |
| 2006/0229996 A1 | 10/2006 | Keithley |
| 2006/0235795 A1 | 10/2006 | Johnson et al. |
| 2006/0239199 A1 | 10/2006 | Blair et al. |
| 2007/0011312 A1 | 1/2007 | Nakamura |
| 2007/0011724 A1 | 1/2007 | Gonzalez et al. |
| 2007/0067828 A1 | 3/2007 | Bychkov |
| 2007/0074276 A1 | 3/2007 | Harrison et al. |
| 2007/0077916 A1 | 4/2007 | Saito |
| 2007/0079135 A1 | 4/2007 | Saito |
| 2007/0094150 A1 | 4/2007 | Yuen et al. |
| 2007/0157304 A1 | 7/2007 | Logan et al. |
| 2007/0167171 A1 | 7/2007 | Bishop |
| 2007/0169174 A1 | 7/2007 | Critten |
| 2007/0174904 A1 | 7/2007 | Park |
| 2007/0186095 A1 | 8/2007 | Ganesan et al. |
| 2007/0198437 A1 | 8/2007 | Eisner et al. |
| 2007/0250920 A1* | 10/2007 | Lindsay ............... G06F 21/31 726/7 |
| 2007/0279227 A1 | 12/2007 | Juels |
| 2007/0283273 A1 | 12/2007 | Woods |
| 2007/0300070 A1 | 12/2007 | Shen-Orr et al. |
| 2008/0028447 A1 | 1/2008 | O'Malley et al. |
| 2008/0034216 A1 | 2/2008 | Law |
| 2008/0037536 A1 | 2/2008 | Padmanabhan et al. |
| 2008/0052180 A1 | 2/2008 | Lawhorn |
| 2008/0109657 A1 | 5/2008 | Bajaj et al. |
| 2008/0120707 A1 | 5/2008 | Ramia |
| 2008/0137554 A1* | 6/2008 | Nandhra ............... H04L 41/12 370/254 |
| 2008/0167106 A1 | 7/2008 | Lutnick et al. |
| 2008/0172730 A1 | 7/2008 | Sandhu et al. |
| 2008/0182598 A1 | 7/2008 | Bowman |
| 2008/0254765 A1 | 10/2008 | Eliaz |
| 2008/0313719 A1 | 12/2008 | Kaliski, Jr. |
| 2009/0037983 A1 | 2/2009 | Chiruvolu et al. |
| 2009/0083430 A1* | 3/2009 | Edge ............... H04L 63/08 709/228 |
| 2009/0093300 A1 | 4/2009 | Lutnick et al. |
| 2009/0106138 A1 | 4/2009 | Smith et al. |
| 2009/0119754 A1 | 5/2009 | Schubert |
| 2009/0119776 A1 | 5/2009 | Palnitkar et al. |
| 2009/0132813 A1 | 5/2009 | Schibuk |
| 2009/0288159 A1 | 5/2009 | Husemann et al. |
| 2009/0232515 A1 | 9/2009 | Marien |
| 2009/0235339 A1* | 9/2009 | Mennes ............... G06F 21/33 726/5 |
| 2009/0249076 A1 | 10/2009 | Reed et al. |
| 2009/0249077 A1 | 10/2009 | Gargaro et al. |
| 2009/0254572 A1 | 10/2009 | Redlich et al. |
| 2009/0259588 A1 | 10/2009 | Lindsay |
| 2009/0259848 A1 | 10/2009 | Williams et al. |
| 2009/0265768 A1 | 10/2009 | Labaton |
| 2009/0265776 A1* | 10/2009 | Baentsch ............... H04L 63/08 726/9 |
| 2009/0307767 A1 | 12/2009 | Semba |
| 2009/0328168 A1 | 12/2009 | Lee |
| 2010/0017860 A1 | 1/2010 | Ishida |
| 2010/0024022 A1 | 1/2010 | Wells et al. |
| 2010/0041391 A1 | 2/2010 | Spivey et al. |
| 2010/0131670 A1 | 5/2010 | Ishii et al. |
| 2010/0153540 A1 | 6/2010 | Li et al. |
| 2010/0180328 A1* | 7/2010 | Moas ............... G06F 21/34 726/6 |
| 2010/0235897 A1 | 9/2010 | Mason et al. |
| 2010/0242104 A1* | 9/2010 | Wankmueller ........ G06F 21/36 726/9 |
| 2010/0262834 A1 | 10/2010 | Freeman et al. |
| 2010/0268831 A1 | 10/2010 | Scott et al. |
| 2010/0325427 A1 | 12/2010 | Ekberg et al. |
| 2010/0329125 A1 | 12/2010 | Roberts et al. |
| 2011/0047372 A1 | 2/2011 | Ganesan |
| 2011/0072499 A1 | 3/2011 | Lin |
| 2011/0153496 A1 | 6/2011 | Royyuru |
| 2011/0159848 A1 | 6/2011 | Pei et al. |
| 2011/0161989 A1 | 6/2011 | Russo et al. |
| 2011/0206039 A1 | 8/2011 | Lee et al. |
| 2011/0208801 A1 | 8/2011 | Thorkelsson et al. |
| 2011/0231354 A1 | 9/2011 | O'Sullivan et al. |
| 2011/0265149 A1 | 10/2011 | Ganesan |
| 2011/0273551 A1 | 11/2011 | Yang et al. |
| 2012/0005483 A1 | 1/2012 | Patvarczki et al. |
| 2012/0124651 A1 | 5/2012 | Ganesan et al. |
| 2012/0166598 A1 | 6/2012 | Yuan et al. |
| 2012/0192255 A1 | 7/2012 | Ganesan |
| 2012/0202517 A1* | 8/2012 | Edge ............... H04W 12/08 455/456.1 |
| 2012/0272056 A1 | 10/2012 | Ganesan |
| 2013/0133086 A1* | 5/2013 | Liberman ............... G09C 5/00 726/28 |
| 2013/0165040 A1 | 6/2013 | McIntyre |
| 2013/0196685 A1 | 8/2013 | Griff et al. |
| 2013/0232547 A1 | 9/2013 | Ganesan |
| 2013/0333006 A1* | 12/2013 | Tapling ............... G06F 21/42 726/6 |

(56) References Cited

U.S. PATENT DOCUMENTS

| | | | |
|---|---|---|---|
| 2014/0020073 A1* | 1/2014 | Ronda | G06F 21/31 726/7 |
| 2014/0298432 A1 | 10/2014 | Brown | |
| 2015/0156267 A1* | 6/2015 | Zhang | H04L 67/18 709/223 |
| 2015/0254672 A1* | 9/2015 | Huesch | G06Q 20/02 705/44 |
| 2015/0302397 A1* | 10/2015 | Kalgi | G06Q 20/36 705/65 |
| 2016/0036777 A1* | 2/2016 | Bartlett | H04L 61/609 709/245 |
| 2016/0148597 A1* | 5/2016 | Hamid | H04W 12/0013 345/173 |
| 2016/0156620 A1 | 6/2016 | Ganesan | |
| 2016/0191494 A1* | 6/2016 | Claes | H04L 63/0853 713/159 |
| 2016/0255477 A1* | 9/2016 | Parulski | H04L 67/18 455/456.3 |
| 2016/0316341 A1 | 10/2016 | Vaccari et al. | |
| 2017/0085635 A1* | 3/2017 | Nicholls | G06F 9/5027 |
| 2017/0123069 A1 | 5/2017 | Kotab | |
| 2017/0289172 A1* | 10/2017 | Turakhia | H04L 63/107 |

FOREIGN PATENT DOCUMENTS

| | | |
|---|---|---|
| JP | 2001-175599 A | 6/2001 |
| JP | 2002-259344 A | 9/2002 |
| JP | 2003-186838 A | 7/2003 |
| JP | 2005-209083 A | 8/2005 |
| JP | 2006-221440 A | 8/2006 |
| JP | 2007-102777 A | 4/2007 |
| JP | 2007-328381 A | 12/2007 |
| JP | 2008-123461 A | 4/2012 |
| JP | 2013-518348 A | 5/2013 |
| WO | 2007/026486 A1 | 3/2007 |
| WO | 2007/103831 A2 | 9/2007 |
| WO | 2007/107868 A2 | 1/2008 |

OTHER PUBLICATIONS

Final Office Action dated Mar. 13, 2018 for U.S. Appl. No. 15/015,592; all pages.
Office Action dated Nov. 28, 2013 for Australian Patent Application No. 2011-209699; all pages.
Office Action dated Jan. 22, 2014 for Australian Patent Application No. 2011-209699; all pages.
Office Action dated Dec. 9, 2013 for Japanese Patent Application No. 2012-551244; all pages.
Office Action dated May 13, 2014 for Japanese Patent Application No. 2013-536605; all pages. [English Translation Attached].
Extended European Search Report dated Dec. 3, 2014 in European Patent Application No. 11737535.2; all pages.
Gralla; "How the Internet Works"; 2006; Que, pp. 346-347.
International Search Report and Written Opinion dated Mar. 25, 2011 in International Patent Application No. PCT/US2011/022482; all pages.
International Search Report and Written Opinion dated Jun. 20, 2012 in International Patent Application No. PCT/US2012/032840; all pages.
International Search Report and Written Opinion dated Apr. 5, 2011 for International Patent Application No. PCT/US2011/023525; all pages.
International Search Report and Written Opinion dated Apr. 20, 2011 for International Patent Application No. PCT/US2011/022486; all pages.
International Search Report and Written Opinion dated Apr. 27, 2011 for International Patent Application No. PCT/US2011/023528; all pages.
International Search Report and Written Opinion dated Jun. 13, 2011 for International Patent Application No. PCT/US2011/032295; all pages.
International Search Report and Written Opinion dated Jul. 11, 2011 for International Patent Application No. PCT/US2011/032271; all pages.
WOT Online; "How to interpret the reputation in reputation icon?"; 2006. Retrieved from http://web.archive.org/web/20061127233933/http://www.mywot.com/en/wot/help/wot_symbols_explained.
Wikipedia; "Geolocation Software"; copy provided in related U.S. Appl. No. 13/669,123; retrieved from http://en.wikipedia.org/wiki/Geolocation_software.
Quova; "How we do it"; copy provided in related U.S. Appl. No. 13/669,123; retrieved from http://www.quova.com/what/how-we-do-it/.
IP2Location; copy provided in related U.S. Appl. No. 13/669,123; retrieved from http://www.ip2location.com.
Padmanabhan, et al.; "An Investigation of Geographic Mapping Techniques for Internet Hosts"; copy provided in related U.S. Appl. No. 13/669,123.
Gueye, et al.; "Constraint-based geolocation of Internet hosts"; copy provided in related U.S. Appl. No. 13/669,123.
Katz-Bassett, et al.; "Towards IP Geolocation Using Delay and Topology Measurements"; see also references in document; copy provided in related U.S. Appl. No. 13/669,123.
Notice of Allowance dated Dec. 26, 2018 in U.S. Appl. No. 15/015,592, all pages.
Advisory Action dated Jan. 14, 2019 in U.S. Appl. No. 13/736,944, all pages.
Non-Final Office Action dated Aug. 8, 2018 in related U.S. Appl. No. 15/015,592, all pages.

* cited by examiner

User Activity Log

| Time (Pacific) | Browsing Activity Log |
|---|---|
| 2010-01-26 19:43:13 | Seal gave "fins up" to merchant.neatsvcs.com |
| 2010-01-26 19:43:22 | Seal gave "fins up" to merchant.neatsvcs.com and one time password provided |
| 2010-01-26 19:43:31 | Seal gave "fins up" to merchant.neatsvcs.com and one time password provided to sign transaction "Pay Alice $40" |
| 2010-01-26 19:43:42 | Seal gave "fins up" to merchant.neatsvcs.com |
| 2010-01-26 19:43:47 | Seal gave "fins up" to merchant.neatsvcs.com and one time password provided |
| 2010-01-26 19:43:57 | Seal gave "fins up" to merchant.neatsvcs.com and one time password provided to sign transaction "Pay Alice $40" |
| 2010-01-26 19:44:06 | Seal gave "fins up" to merchant.neatsvcs.com |
| 2010-01-26 19:44:10 | Seal gave "fins up" to merchant.neatsvcs.com |
| 2010-01-26 19:44:15 | Seal gave "fins up" to merchant.neatsvcs.com |

ENHANCING TRANSACTION AUTHENTICATION WITH PRIVACY AND SECURITY ENHANCED INTERNET GEOLOCATION AND PROXIMITY

This application is a continuation-in-part of pending U.S. patent application Ser. No. 13/736,944, filed Jan. 9, 2013, which is a continuation-in-part of U.S. patent application Ser. No. 13/669,123, filed Nov. 5, 2012, (now U.S. Pat. No. 8,589,459), which is a continuation of U.S. patent application Ser. No. 12/938,245, filed Nov. 2, 2010, (now U.S. Pat. No. 8,341,236), which claims the benefit of Provisional U.S. Application No. 61/257,190, filed Nov. 2, 2009 and entitled "Project Hawk", and this application is a continuation-in-part of pending U.S. patent application Ser. No. 15/015,592, filed Feb. 4, 2016 and published Jun. 2, 2016 as U.S. Patent Application Publication No. 2016/0156620, which is a continuation of U.S. patent application Ser. No. 14/330,025, filed Jul. 14, 2014, (now U.S. Pat. No. 9,325,702), which is a continuation of U.S. patent application Ser. No. 13/011,739, filed Jan. 21, 2011 (now U.S. Pat. No. 8,806,592), which is a continuation-in-part of U.S. patent application Ser. No. 13/011,587, filed Jan. 21, 2011 (now U.S. Pat. No. 8,789,153), which claims the benefit of Provisional U.S. Application No. 61/298,551, filed Jan. 27, 2010, and the contents of all of the above-identified applications are hereby incorporated by reference herein in their entirety.

FIELD OF THE INVENTION

Embodiments of the invention relate to security and privacy, and specifically to the determination of the physical location and proximity of Internet users and devices in a way that enhances security and privacy.

BACKGROUND OF THE INVENTION

Companies running web sites often have good reason to try to ascertain the physical location (or geolocation) of the user accessing their sites. Such geolocation information is useful for purposes such as marketing (e.g. to better target offers or advertisements) as well as fraud detection (e.g. if a user who normally checks their bank account from Wichita, Kans. is found to be logging in from East Europe, it might be reason enough for the bank to track the user's activities on the web site carefully).

When a user accesses a web site the only piece of information the web site knows is the user's origin IP address. To get from an IP address to a physical address requires the use of a technology known as IP geolocation. Ranges of IP addresses are assigned to Internet Service Providers who then make them available to end customers in different locales. For instance, the range 149.141.x.x might currently be in use by a particular ISP who is using that range in Alexandria, Va. IP geolocation technology essentially provides a reverse lookup on a database of a physical location given an IP address. The database is maintained by determining which ranges are in use in which locales and then updating the database as changes occur.

IP geolocation has two significant shortcomings. First, the database underlying the reverse look-up is largely static and has to be manually updated which can result in errors. Perhaps more critical is the second shortcoming in that IP geolocation identifies a user very precisely and ties them to a particular PC. For most uses of IP geolocation it is usually sufficient for a web site to know that the user is currently located, for example, in Alexandria, Va. Knowing that they are precisely at IP address 141.149.1.1, and storing that information, is a needless violation of the user's privacy and in general storing personally identifiable data, especially when not required, is a needless increase in costs and potential liability to the web site.

An alternate method already prevalent in smartphones, and some computers, is to have a program on the phone to report the GPS coordinates of the user. Such GPS systems also provide more precise location data than is needed in most cases, and moreover cannot necessarily be used for fraud detection. This is because the GPS coordinates are self-reported by the software on the smartphone and consequently can fairly easily be thwarted by an attacker.

SUMMARY DISCLOSURE OF THE INVENTION

Embodiments of the invention combine privacy enhanced geolocation and proximity with transaction authentication.

According to one aspect, a method comprises receiving from a web server a request for a transaction initiated at a user device. The method further comprises transmitting to the user device a one-time password derived from a secret shared with the web server and details of the transaction. The method further comprises receiving from one or more slave servers one or more messages originating from the user device and passing respectively through the one or more slave servers. Each of the messages indicates a time of travel of the respective message from the user device to the respective one slave servers. The method further comprises, based on the times indicated in the one or more messages, estimating a location of the user device. In some embodiments, all of the steps are performed by a single master server. In some embodiments, the content of the one or more messages includes or is derived from the one-time password. In some embodiments, estimating the location of the user device comprises estimating an absolute geographic location of the user device. In some embodiments, estimating the location of the user device comprises estimating a relative location of the user device, in relation to at least one of the slave servers.

According to another aspect, a method comprises receiving from a web server a request for a transaction initiated at a first user device, and transmitting to a second user device a one-time password derived from a secret shared with the web server and details of the transaction. The method further comprises receiving from one or more slave servers a first set of one or more messages originating from the first user device and passing respectively through the one or more slave servers. Each of the messages indicates a time of travel of the respective message from the first user device to the respective one of the slave servers. The method further comprises, based on the times indicated in the first set of one or more messages, estimating a location of the first user device. In some embodiments, all of the steps are performed by a single master server. In some embodiments, the content of the one or more messages includes or is derived from the one-time password. In some embodiments, estimating the location of the user device comprises estimating an absolute geographic location of the user device. In some embodiments, estimating the location of the user device comprises estimating a relative location of the user device, in relation to at least one of the slave servers. In some embodiments, the set of one or more messages is a first set of one or more messages, and the method further comprises receiving from the one or more slave servers a second set of one or more messages originating from the second user device and passing respectively through the one or more slave servers, each of the messages indicating a time of travel of the respective message from the second user device to the respective one of the slave servers; and based on the times indicated in the first and second sets of one or more messages, estimating the geographic proximity of the first and second user devices. In some embodiments, all of the steps are performed by a single master server. In some embodiments, the first and second user devices are reciprocal slaves. In some embodiments, the content of the one or more messages in the second set includes or is derived from the one-time password.

According to another aspect, a computerized system comprises a processor and memory. The memory holds instructions that, when executed by the processor, cause the system to receive from a web server a request for a transaction initiated at a user device, and transmit to the user device or to a second user device a one-time password derived from a secret shared with the web server and details of the transaction. The instructions further cause the system to receive from one or more slave servers one or more messages originating from the user device and passing respectively through the one or more slave servers, each of the messages indicating a time of travel of the respective message from the user device to the respective one of the slave servers. The instructions further cause the system to, based on the times indicated in the one or more messages, estimate a location of the user device. In some embodiments, the content of the one or more messages includes or is derived from the one-time password. In some embodiments, the instructions, when executed by the processor, cause the system to estimate an absolute geographic location of the user device. In some embodiments, the instructions, when executed by the processor, cause the system to send the one-time password to the second user device. In some embodiments, the set of one or more messages is a first set of one or more messages, and the instructions, when executed by the processor, cause the system to receive from the one or more slave servers a second set of one or more messages originating from the second user device and passing respectively through the one or more slave servers, each of the messages indicating a time of travel of the respective message from the second user device to the respective one of the slave servers; and based on the times indicated in the first and second sets of one or more messages, estimate the geographic proximity of the first and second user devices. In some embodiments, the first and second user devices are reciprocal slaves.

Additional aspects, advantages, and novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

PREFERRED EMBODIMENTS OF THE INVENTION

A more robust and less intrusive geolocation mechanism for IP geolocation than those described above uses a series of 'slave' servers sending traffic to a 'master' server via the user's browser or app, and then computing appropriate statistics to triangulate on location. This technique also provides a solution to the 'proximity' problem. Namely, how can a web service, such as an on-line banking site tell if a user at a computer or ATM machine is in possession of a particular smartphone. One approach, prone to technical difficulties is to have the smartphone and computer/ATM communicate. A more robust mechanism is to use the triangulation scheme mentioned earlier but with reciprocal 'slave' servers located on the two devices.

The problem of transaction authentication we refer to is one of getting confirmation from an on-line user that they indeed placed the transaction that the web service receives. One approach to achieving this in a convenient fashion uses a quasi out of band authentication system. Here the user has an always on connection from a separate device to a security server. The user starts this connection using regular out of band authentication using SMS or voice calls or email. When the user initiates a transaction at say their computer, the web service sends the transaction to the security server which sends it to the separate device and the user can confirm or deny the transaction.

In this disclosure we show how the geolocation of a user based on an analysis of traffic to and from their device to a series of external servers can be married to a quasi out of band architecture to further enhance the security of transaction authentication.

Geolocation

Figure 1:
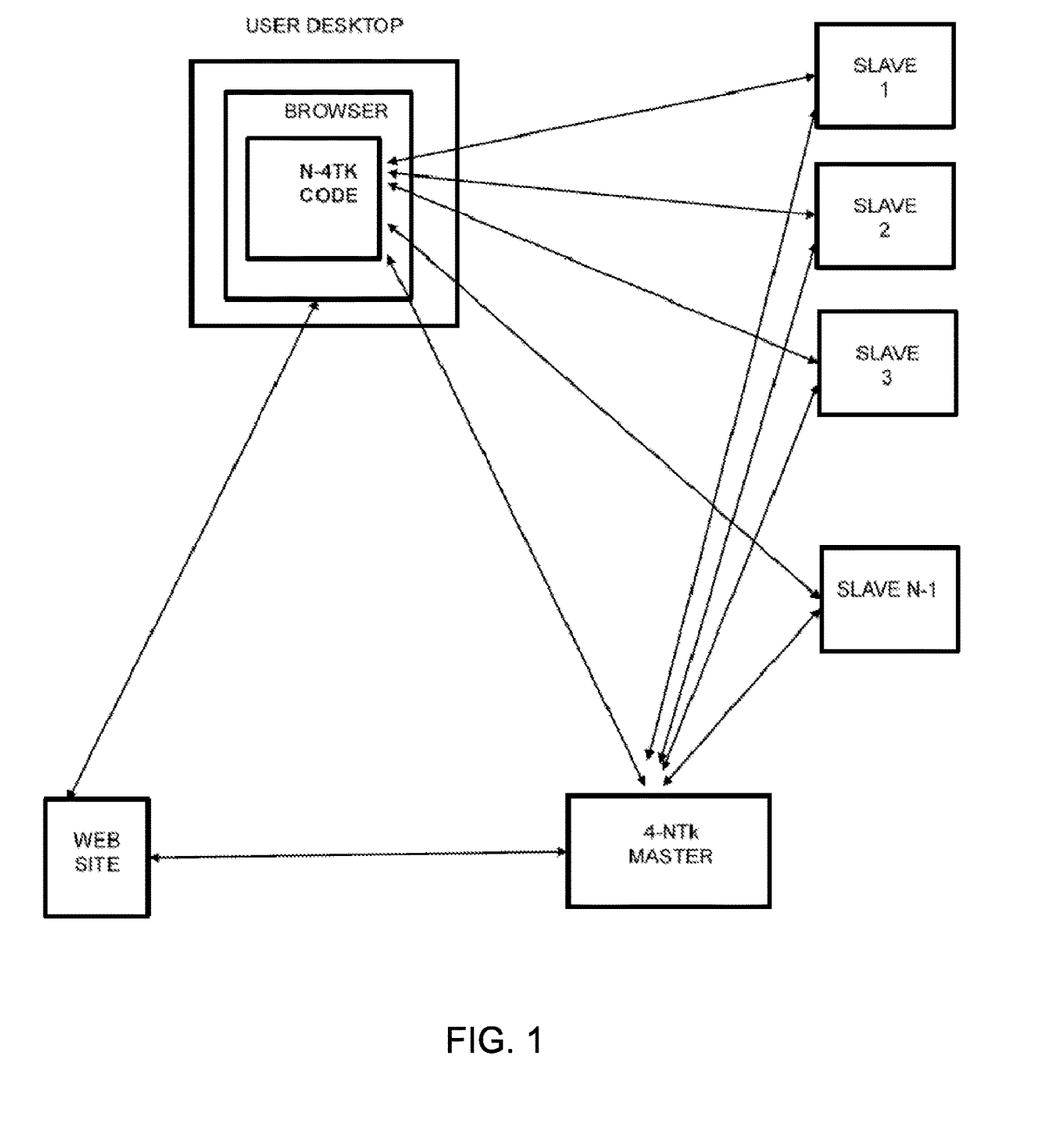
FIG. 1 describes the components for privacy enhanced geolocation, according to embodiments of the invention.

Our preferred embodiment includes the following components as shown in FIG. 1:

- a web site which is using the N-4Tk system which serves up the page containing the N-4Tk code to the user's browser or smartphone app;
- a user's PC that is being geolocated and on which the N-4Tk client code runs;
- a Master server which will compute the geolocation and report back to the web server; and
- N-1 geographically distributed Slaves in the system.

Geolocation using an N-4Tk system is described in more detail in U.S. Pat. Nos. 8,341,236 and 8,589,459 both previously incorporated by reference, and measures the time taken to travel at a particular time for a message of size k among a number of devices over a network. The process is initiated by the user browsing to a page at a web site that contains the N-4Tk client code. This client code will typically be embedded behind the scenes of a page into which the user types in a UserID, or perhaps a CAPTCHA. Several variations are possible here, but the general idea is to invoke the N-4Tk code at some point where the user is typing in characters. For simplicity of exposition we will assume here that the user is typing in their UserID.

As the user types in each character in the UserID, the character is padded with k−1 characters (say 0s) and sent to the web site, the Master, and the Slaves (the addresses of which are available to the client code). Subsequent characters are sent after receipt of an acknowledgement from the Master. Each character is time stamped at the last possible instant before being sent, and again time stamped at the first possible instant after being received. The difference between the two time stamps is a measure of the time taken for the message to travel from the user to the particular server (either Master or Slave). Each Slave forwards the message (with the time stamps) to the Master. The client sends a special "End of Transaction" character to indicate that the user has finished typing in the UserID.

The Master having received all the messages from the Slaves, as well as the messages sent to it directly, now has all the data needed to compute the N-4Tk location of the User. If the Master has not encountered this UserID (from this Web Site) before it, it records it, else, it might look up the historical record of N-4Tk locations for this user. It then returns its estimate of the locale of the user to the web site, or a risk score indicating the variance from the previously measured locale.

To account for processing delays on the User's PC or local network, which would uniformly delay all the messages, the Master can be set up to take note of unusual delays affecting messages to all the servers and adjust the metric accordingly. The Master can also examine the delays between keystrokes to look for unusual patterns.

In all these calculations the Master computes the mean and standard deviation of the message time to each server for all the characters in the UserID. For instance, for a 15 character UserID, the Master in effect has a sample size of 15 measurements to each server. This allows it to get a better estimate than were it doing a single measurement.

An alternate metric that can be calculated is for the client code to request a message of size k from each Slave and then forward it to the Master. This measures the N-4Tk distance from each Slave to the Master via the User.

The Master can additionally require the Slaves to periodically directly send it messages so that it can compute a 4Tk direct distance from itself to the Slaves, and use that information to refine the metrics calculated above.

The accuracy of all of the above metrics improve as the number of Slaves increases, however, this brings additional costs and latency. One approach is to iteratively "close in" on the user by using a different set of Slaves in each iteration. For instance the system could first hone in on the country of origin, next the major metro area and then close in on the specific locale.

Finally, such a system that is making calculations for a large number of users (perhaps for multiple web sites) is in effect calculating a 'time of day' sensitive bandwidth map of the Internet as a side effect. This information can be used for intelligent placement of caches or routing of traffic.

In some embodiments, the system may determine the absolute geographic location of the user's device as precisely as possible. In other embodiments, the system may not determine a precise or absolute geographic location of the user's device, but may instead provide approximate or even relative geographic information. For example, rather than determining that a user's smart phone is in Alexandria, Va., it may be sufficient to simply determine that the device is west of the Atlantic Ocean. In another example, it may be sufficient to determine that a user's device is simply north of a particular one of the slave servers.

And while certain servers have been referred to as being either a master or slave, these designations may be arbitrary in some embodiments. Any one of the servers may act as the master or as a slave at different times. For example, the servers may share the computational burden of the geolocation process by designating a different one of the servers as the master for different transactions.

Proximity

Our preferred embodiment includes the following components:
 a web site which is using the N-4Tk system which serves up the page containing the N-4Tk code to the user's browser or smartphone app;
 each user's device that is being geolocated running the N-4Tk client code and running an instance of the N-4Tk slave;
 a Master server which will compute the geolocation and report back to the web server; and
 N-1 geographically distributed Slaves in the system.

Proximity determination is described in more detail in U.S. patent application Ser. No. 13/736,944, filed Jan. 9, 2013 and previously incorporated by reference. We first consider the two entity proximity case. In our first example Alice is at an ATM machine performing a transaction. During the course of this transaction she is performing key entry into the ATM machine. The back end system, which is aware that Alice has a smartphone with an appropriate client installed, sends a confirmation message to Alice. Alice is asked to enter a few characters she reads off the ATM machine into the client. As Alice is performing data entry at two devices that are in close proximity it might appear that it is immediately possible to use the 4Tk statistics to determine that Alice and the ATM are in close proximity. However, this may not take into account that the ATM might have a high speed connection to the Internet, whereas Alice's smartphone might have a much slower speed 3G connection traveling along a different path.

The key innovation to solve this problem is to make both the ATM machine and the client on Alice's smartphone reciprocal slaves. i.e. when Alice types into the ATM machine some of the characters are making their way to her smartphone from the ATM, and conversely when she is typing into the smartphone, some of the characters are making their way into the ATM machine. Now these messages are travelling the same distance over equivalent networks in both directions, and it is consequently possible to get a far more accurate reading of the proximity of the ATM machine and Alice. While messages passing through the various other slaves are also considered, the system may pay special attention to the timing of the message sent between the reciprocal slaves. For example, the travel times of messages between the reciprocal slaves may be given higher weightings than the travel times of other messages in a statistical estimation of the proximity of the two slave servers.

In our next example Alice and Bob are typing on respective smart devices. Perhaps Bob is a checkout clerk and Alice is a shopper. An identical process plays out, except that in case different users are doing the typing.

It is possible for the two clients to at a synchronized or at least similar point start sending padded characters to each other with or without any keystrokes actually being typed by either user, e.g. Alice and Bob press GO to start the process.

The same innovation can be used for more than two entities, perhaps taking advantage of the fact that if it is known that A is in proximity to B and B to C, then A and C are in proximity.

As in the geolocation technique described above, proximity may also be determined in an approximate or relative way, and the designation of a server as a master or a slave may be arbitrary in some embodiments.

Transaction Authentication

Transaction authentication according to embodiments of the invention is described in more detail in U.S. Pat. Nos. 8,789,153, 8,806,592, and 9,325,702 and U.S. Patent Application Publication No. 2016/0156620, all previously incorporated by reference. In our preferred embodiment the user has a transaction authentication application, which preferably (but not necessarily) runs on a separate device from the device from which the user is initiating the transaction. For instance, the user is at a computer browsing the web, and has the transaction application running on their smartphone. The user authenticates themselves to the transaction authentication application using some method of strong authentication, preferably out of band authentication, at periodic intervals (e.g. once a month). When the user initiates a transaction at a web service, the web service forwards the transaction to a security server which communicates the transaction to the user via the transaction authentication application. The user then confirms or denies the transaction (or enters details about the transaction) at which point the security server lets the web service know the result.

Figure 2:
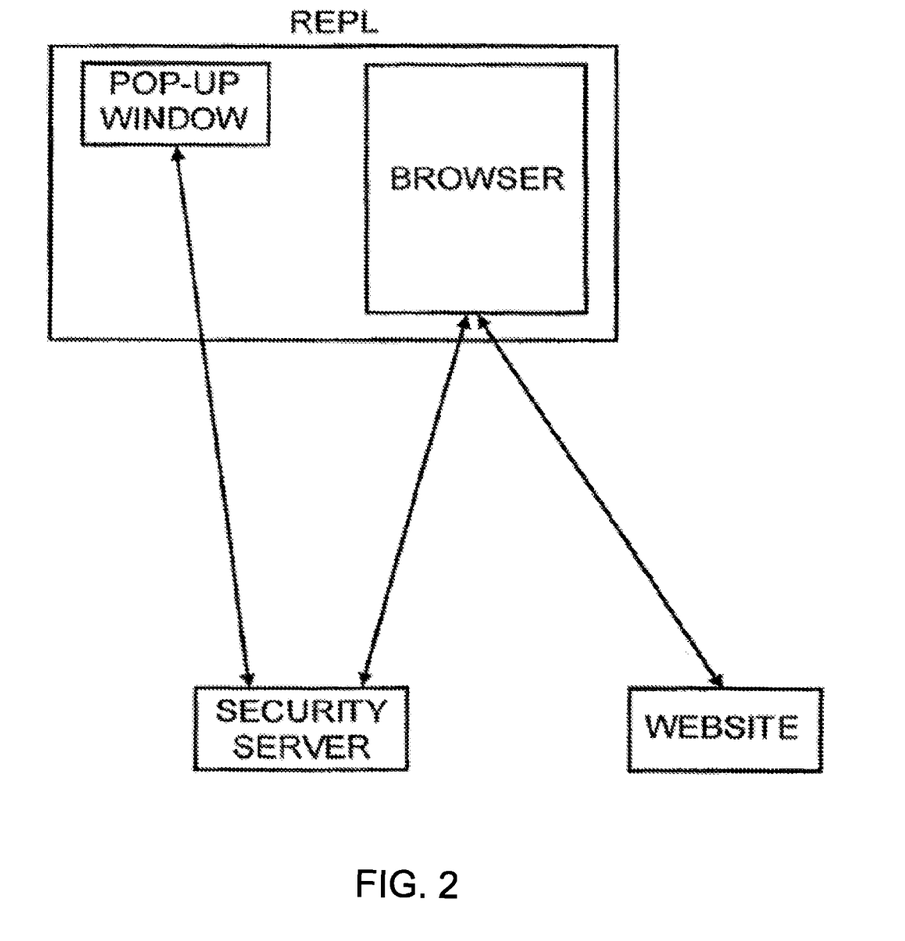
FIG. 2 illustrates a system for implementing transaction authentication, according to embodiments of the invention.
Figure 3:
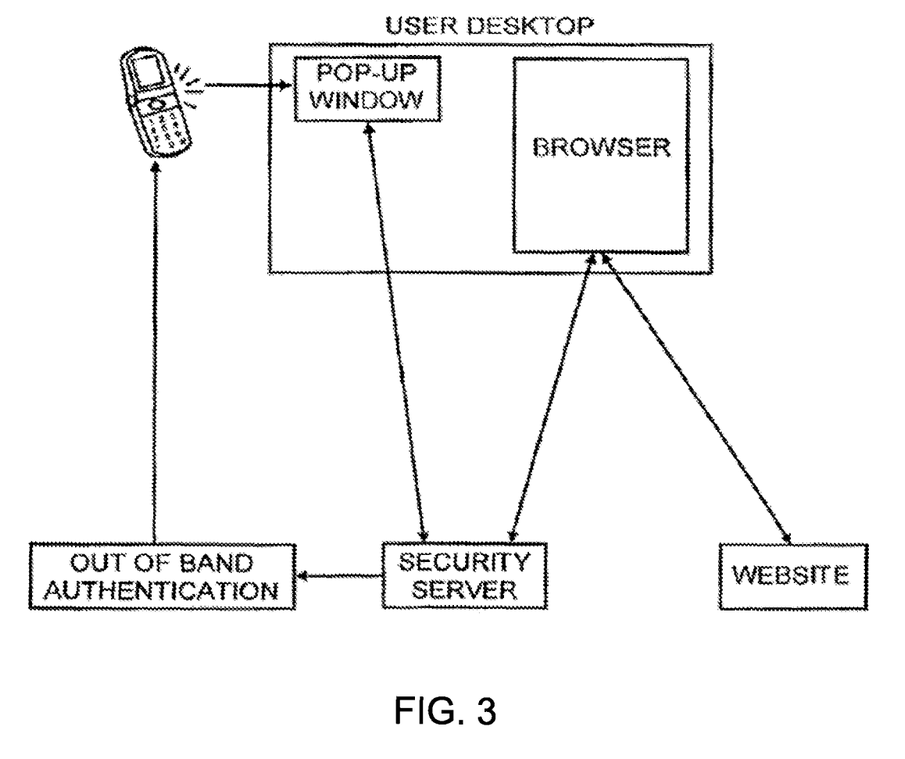
FIG. 3 illustrates another system for implementing transaction authentication, according to embodiments of the invention.

A system for implementing a preferred embodiment of transaction authentication is shown in FIGS. 2 and 3, and comprises
  a security server;
  a pop-up window on the user's desktop;
  a browser on the user's desktop; and
  the web site at which the user is performing the transaction.

The user will first go through a set up and personalization phase which is a one-time process, and will then start up or activate the pop up using a technique such as out of band authentication. At this point the security server will have an active communication channel open to the user which it identifies by some user identifier, for instance the phone number used for out for band authentication. Further, the web site at which the user is transacting and the security server would have previously agreed on a shared secret.

The user using the browser selects a transaction, e.g. "Pay Alice $100", which is transmitted by the browser to the web server. The web server transmits this transaction to the security server via the user's browser. The security server computes a one-time transaction signature as a function of (i) the transaction details and (ii) the secret it shares with that particular web site. The security server then transmits this one-time transaction signature to the user's pop-up window. The user cuts and pastes or otherwise copies this one-time transaction signature into the web browser and the signature is transmitted back to the web site. The web site independently computes the transaction signature using (i) the transaction details and (ii) the secret it shares with the security server, and compares it with the one received from the user. If the two signatures match then the web server can be assured that the security server saw the same transaction it sent (i.e. not a transaction manipulated en route to the security server), and since the security server is showing the user the transaction in an independent channel, user confirmation of the transaction is obtained.

In a second preferred transaction authentication embodiment, the pop-up is implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the one-time passwords used for authentication and would instead have to type them into the web browser operating on a different network device. These form factors provide additional layers of security simply by being independent of the user's desktop computer running the browser.

In either the first or second preferred embodiment as a user performs multiple logins and transactions the pop-up or its substitute has the ability to store a history or log of these events. Such data can then be fed to risk management engines which today only have access to patterns of user activity which they observe from one or more web sites.

In summary, the binding is significantly strengthened between the user, the security server acting as an Identity Provider and the website which is the Relying Party in the case of transactions made over a network, such as the purchase of a product by a user at the web site. Here, we assume that the security server and the web site have a priori agreed on a shared secret (the system is easily extended to use public key cryptography). Additionally, as shown in FIG. 3, we also assume that the user has used some method, for instance out-of-band authentication, to authenticate to the security server. When the user wishes to enter into a transaction at a website, such as the purchase of a product offered at the web site or the transfer of funds from a bank account, the web site communicates transaction details (such as the type and amount of the transaction), which are presented both on a web page displayed to the user via the user's browser and on a pop-up window. Before proceeding with the transaction, the web site requires authentication and confirmation of the transaction, or what is commonly referred to as a signature of the user on the transaction. Therefore, the web page additionally displays a blank for entry of the user's signature. Furthermore, the website also communicates a request for the user's signature on the identified transaction to the security server. The security server calculates a one-time password as a function of (i) the secret it shares with the web site and (ii) the applicable transaction details displayed in the pop-up window, and displays the one-time password to the user in the pop-up window. The user enters (perhaps by cutting and pasting) this one-time password onto the web page, which serves as the user's signature on the transaction, which is thereby transmitted to the web site. The website confirms the authenticity of the signature by re-computing the one-time password from the secret it shares with the security server and the transaction details. Here again, this system has all the security properties of one-time passwords, yet has the tremendous advantage that it does not require a shared secret with each user, and it is only the security server and the web sites that need shared secrets for the purpose of generating one-time passwords used as signatures on transactions. The actual one-time password can, if desired, also be constructed based on a time stamp or a counter based OTP algorithm (in the way we use these algorithms the time or counter value needs to be communicated by the security server to the web site; or potentially computed deterministically using some agreed upon formula).

A further extension provides an application which allows the pop-up-window itself to reside on the user's smart phone, smart card or other small personal intelligent mobile network device, rather than on the network device, e.g. a desktop computer, being used to access the applicable website via its browser. For example, this is easily accomplished on a smart phone because the phone is already personalized and, in accordance with the techniques described above, does not need to store a special secret or execute one-time password software. Rather, only the website and the security server share the necessary secret and only the security server generates the one-time passwords required for user authentication and user signature.

Figure 4:
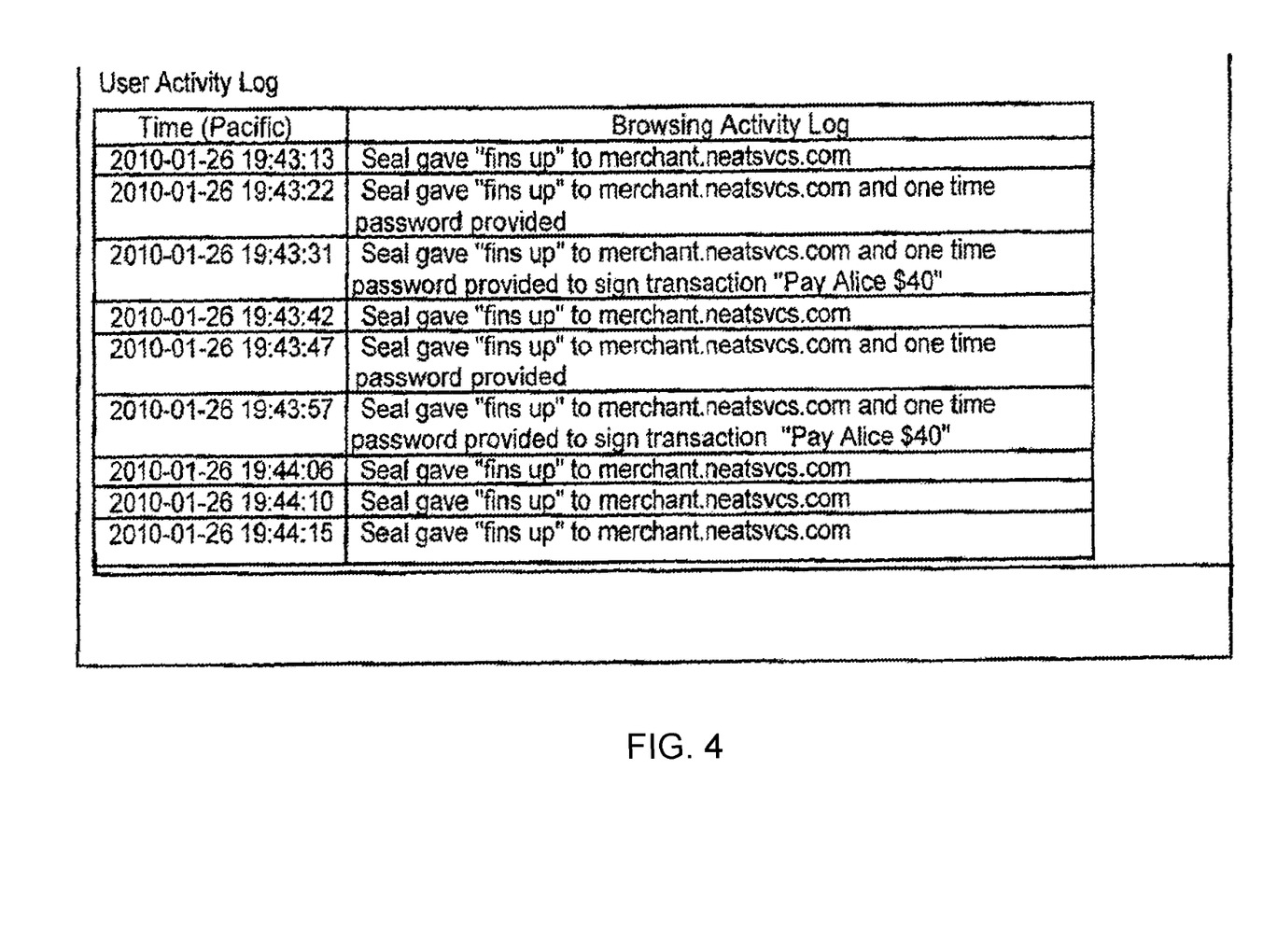
FIG. 4 illustrates a log in accordance with embodiments of the invention.

Finally, embodiments allow us to provide augmented risk intelligence analysis. In this regard, conventional risk analysis relies on data from websites. However, because of the flow of information, a log of data, such as one of the type shown in FIG. 4, capturing the user's activities while the pop-up window was active can be easily maintained. The log could, for example, be maintained by the security server website, and the user can access this log. If desired the user or the security server can compute the user's risk profile. Additionally, or alternatively, the logged data can be forwarded to a third party risk engine, where it can be married with data received from websites visited by the user so that the risk engine can provide the user with an augmented risk intelligence analysis.

A further preferred embodiment allows for direct communications of authentication requests and transaction information between the website and the security server.

As described with reference to FIGS. 5 and 6, the user will first go through a set up and personalization phase which is a one-time process, and will then start up or activate the pop up using a technique such as out of band authentication. At this point the security server will have an active communication channel or session open to the user which it identifies by some user identifier, for instance the phone number used for out of band authentication. Further, the web site at which the user is transacting and the security server would have previously agreed on a shared secret.

The user using the browser selects a transaction, e.g. "Pay Alice $100", which is transmitted by the user's browser) to the web server. The web server transmits this transaction to the security server via a direct link that has been established between the web site and the security server (rather than via the user's browser). The security server computes a one-time transaction signature as a function of (i) the transaction details and (ii) the secret it shares with that particular web site. The security server then transmits this one-time transaction signature to the user's pop-up window. The user cuts and pastes or otherwise copies this one-time transaction signature into the web browser and the signature is transmitted back to the web site. The web site independently computes the transaction signature using (i) the transaction details and (ii) the secret it shares with the security server, and compares it with the one received from the user. If the two signatures match then the web server can be assured that the security server saw the same transaction it sent (i.e. not a transaction manipulated en route to the security server), and since the security server is showing the user the transaction in an independent channel or session, user confirmation of the transaction is obtained.

As will be recognized by those skilled in the art, the pop-up can be implemented in one of a variety of different form factors. One variety contemplates the pop-up window being on an application on a mobile device, another contemplates the window using a dedicated part of the display area of a personal mobile network device, such as a smart phone, and the last contemplates the pop-up window being embodied in dedicated hardware similar to that of a smartcard, which has communication capabilities. In all cases all functionality will work in exactly the same fashion, except that the user can no longer cut and paste the one-time passwords used for authentication and would instead have to type them into the web browser operating on a different network device. These form factors provide additional layers of security simply by being independent of the user's desktop computer running the browser.

While in the examples described above the user initiates a transaction using a browser, other techniques are possible. For example, a user may initiate a transaction using a software application specially installed on his or her device, rather than using browser.

Combining Transaction Authentication with Privacy Enhanced Proximity/Geolocation In our preferred embodiment the following components described above are combined (see FIG. 7):
  the security server also acting as the geolocation/proximity master server; and
  the user has one application that contains the logic for geolocation, a 'slave' server for 'proximity' calculations, and the requisite code for transaction authentication.

Figure 7:
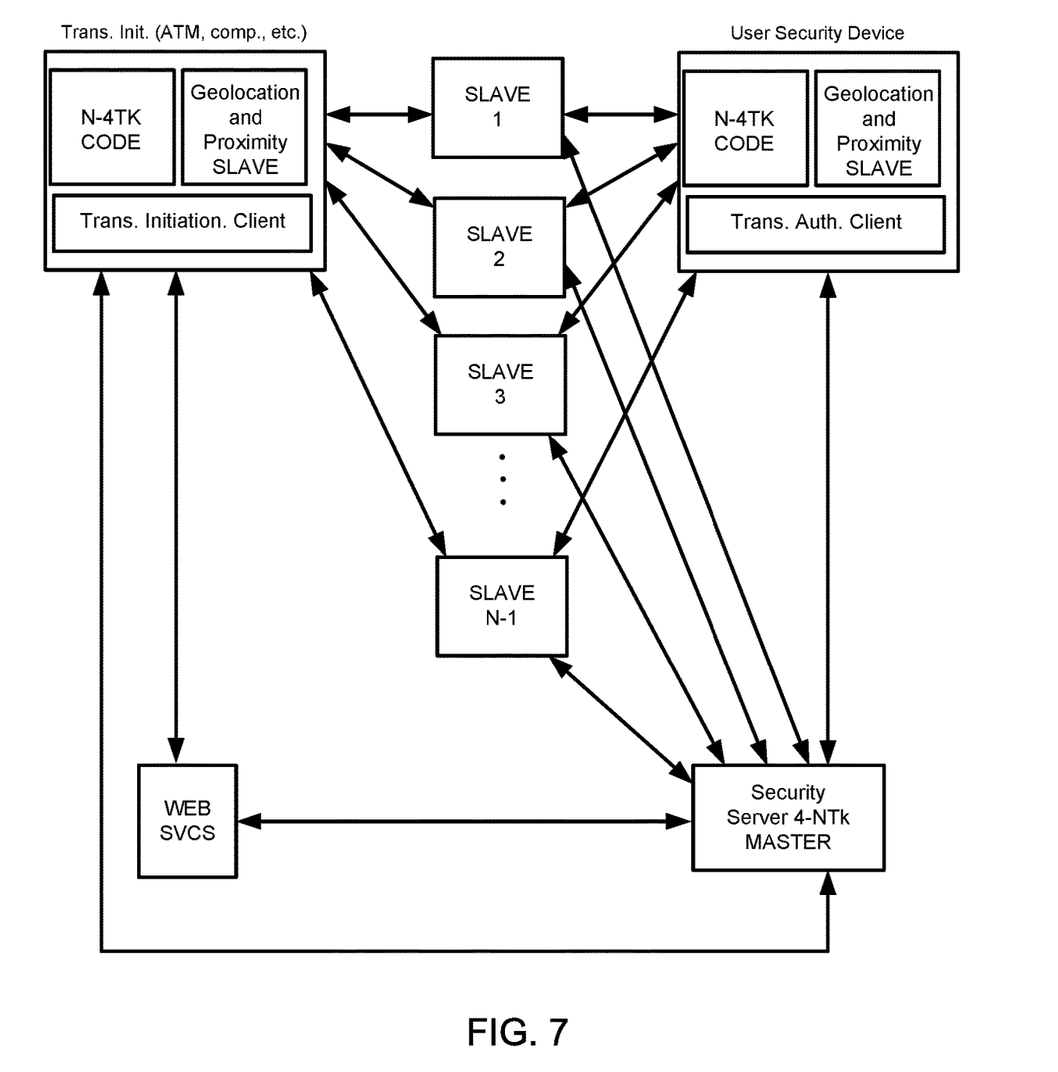
FIG. 7 describes components for combining transaction authentication with privacy enhanced proximity and geolocation, in accordance with embodiments of the invention.

One way in which the process could play out is as follows:
1. User downloads combined client and performs bootstrap out of band authentication to establish always-on connection to the security server. As part of this process the user's geolocation is determined using the 4Tk techniques described earlier.
2. User initiates transaction at a web service.
3. Code embedded in the web service application initiates a connection to the security server to perform geolocation of the user during transaction initiation.
4. Web service sends transaction to security server.
5. Security server sends transaction to user security device.
6. The security server initiates a connection to the combined application on the user's security device.
7. The security service performs geolocation on the security device, and compares it to the device from which the transaction was initiated and checks the results.
8. Coincident with above the security server runs the proximity process between the user transaction initiation device and the user security device and checks the results.
9. Coincident with above the security server obtains user input on transaction confirmation.

In one specific implementation, the master server may receive messages of a predefined message size sent from a user network device. Each message includes a user input character. The master server also receives a time stamp associated with each message and corresponding to the time that message was sent by the user network device to the master server. The master server stamps each of the received messages with a time stamp corresponding to the time of receipt of that message at the master server. The master server further receives the same messages sent from a first slave server, and a time stamp associated with each message and corresponding to the time that message was sent by the user network device to the first slave server. The master server further receives a time stamp corresponding to the time of receipt of that message at the first slave server.

Similarly, the master server also receives another set of the same messages from a second slave server, along with time stamps corresponding to the time that each message was sent by the user network device to the second slave server, and the time that each message was received at the second slave server. The master server computes, based on the time stamps, the time taken to communicate the messages (i) from the user network device to the master server, (ii) from the user network device to the first slave server, and (iii) from the user network device to the second slave serve. Based on these computed times, the master server determines a geographic location of the user network device.

While the above examples are described using two slave servers, it will be recognized that any number of slave servers may be used, for example three, four, five, or more slave servers.

In addition, the master server receives a request from a network site to have a user of the user network device authenticated and first information. The master server calculates a one-time password based on the first information and transmits the one-time password to another user network device. For example, the first user network device may be a desktop computer on which the user is initiating a transaction, and the second user network device may be the user's cellular telephone. The user may enter the one-time password into the desktop computer, authenticating the user. As is explained above, the one-time password may not be shared with the user or with either of the user network devices.

In some embodiments, the one-time password may be used as or to generate the messages used in the geolocation. This technique may be particularly advantageous as the master server may generate the one-time password and may therefore know its length or other characteristics.

Figure 5:
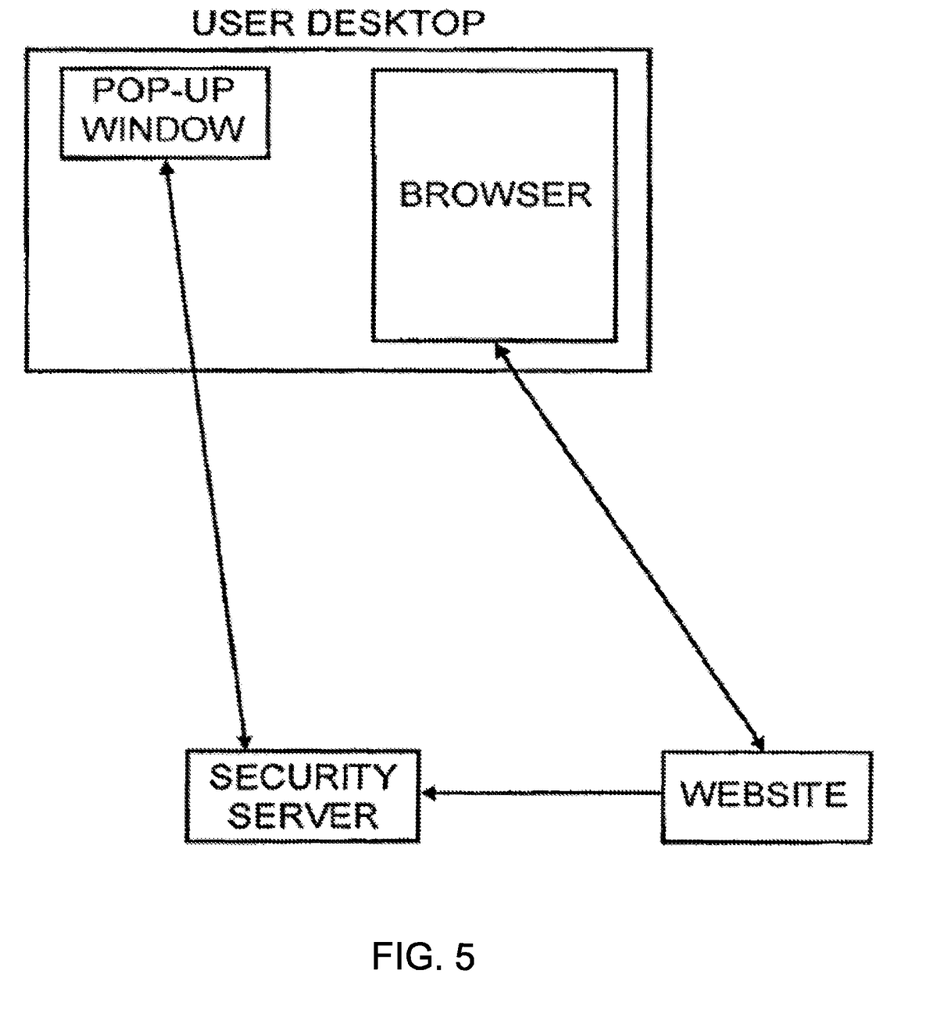
FIG. 5 illustrates transaction authentication in accordance with embodiments of the invention.
Figure 6:
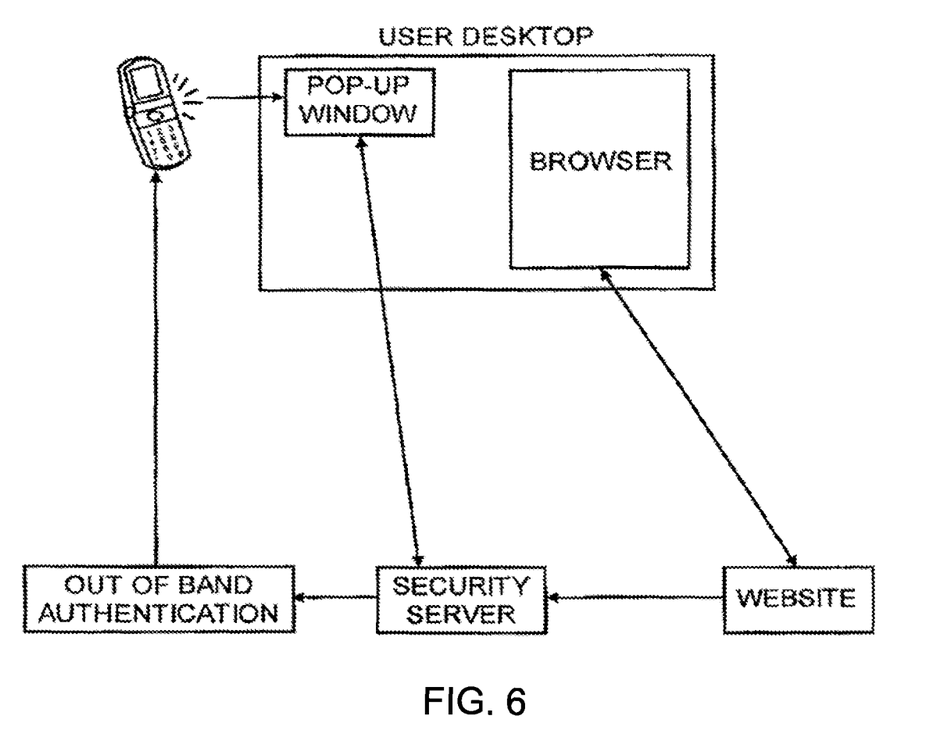
FIG. 6 illustrates transaction authentication in accordance with embodiments of the invention.

The request to have the user authenticated may be received directly from the network site, as shown in FIG. 5, or may be received indirectly from the network site via the first user network device, as shown in FIG. 3.

For further authentication, the master server may also receive messages from each of the network devices sent via the other of the network devices. That is, the two network devices may act as reciprocal slaves. These message may be helpful to the master server to estimate whether the two network devices are in close proximity.

For example, the master server may receive messages of a predefined message length sent from the second network device via the first network device, along with a time stamp corresponding to the time that each message was sent by the second network device to the first network device. The master server also receives a time stamp corresponding to the time of receipt of each message at the first network device.

Similarly, the master server receives the same messages sent from the first network device via the second network device, and a time stamp corresponding to the time that each message was sent by the first network device to the second network device. The master server also receives a time stamp corresponding to the time that each message at the second network device.

Based on the time stamps, the master server can compute the time taken to communicate the messages (i) from the second network device to the first network device, and (ii) from the first network device to the second network device. Based on the computed times, the master server can determine a geographic proximity of the first and second network devices to each other. The slaves on the user devices can receive messages using various technologies such as TCP/IP services or PUSH technology. For example, a slave on a user device may receive a message pushed to it, and may activate, in response to the receipt of the message, application software for time stamping and forwarding of the message to the geolocation master server. Other variants will be obvious to one skilled in the art. While messages passing through the various other slaves are also considered, the system may pay special attention to the timing of the message sent between reciprocal slaves. For example, the travel times of messages between the reciprocal slaves may be given higher weightings than the travel times of other messages in a statistical estimation of the proximity of the two slave servers.

In other embodiments, there may not be two user network devices involved in a transaction. For example, the one-time password may be transmitted to the user of the network device from which a transaction was initiated, for entry by the user of the user network device onto a network page associated with the network site and displayed on the user network device. The network site may then subsequently verify the one-time password to authenticate the user.

In the embodiments described above, the master server performs both the geolocation calculations, and calculates and transmits the one-time password. In other embodiments, these two functions may be performed by different servers. For example, one server may perform the geolocation at the behest of the network site, and another server may calculate and transmit the one-time password, also at the behest of the network site.

In other embodiments, the direction of message transmission may be reversed from that described above. For example, in the embodiments described above, the master server receives messages sent from the user network device through two slave servers, and uses the sending and receipt times to geolocate the user network device. In other embodiments, the messages may originate at the slave servers and may be sent through the user network device to the master server. Time stamps corresponding to the times of sending the messages from the slave servers and the times of receipt of the messages by the user network device are forwarded to the master server, which can geolocate the user network device based transmission times computed from the time stamps. The authentication steps may be performed similarly to the authentication steps described above.

Regardless of the direction of message transmission, it will be recognized that more than two slave servers may be used, for example three, four, five, or more slave servers.

In another specific implementation, a security server receives transaction information representing a transaction between a network user and a network site. The security server calculates a one-time password based on (i) the received transaction information and (ii) a secret shared by the security server and the network site, but not by the user. The one-time password is independently calculable by the network site based on the shared secret and the transaction information. The security server then transmits the calculated one-time password to a first user network device, for presentation on a window displayed by the first user network device and entry by the user onto a network page associated with the network site and displayed on a second user network device.

The security server further receives messages of a predefined message size sent from one of the user network devices. Each message includes a user input character. The security server also receives a time stamp corresponding to the time that each message was sent by the one of the user network devices to the security server. The security server stamps each of the received messages with a time stamp corresponding to the time of receipt of that message at the security server.

The security server also receives (i) the same messages from a first slave server, (ii) a time stamp associated with each message and corresponding to the time that message was sent by one of the user network devices to the first slave server, and (iii) a time stamp corresponding to the time of receipt of that message at the first slave server. Similarly, the security server also receives (i) the same messages from a second slave server, (ii) a time stamp associated with each message and corresponding to the time that message was sent by the one of the user network devices to the second slave server, and (iii) a time stamp corresponding to the time of receipt of that message at the second slave server. The security server computes the time taken to communicate the messages (i) from the one of the user network devices to the master server, (ii) from the one of the user network devices to the first slave server, and (iii) from the one of the user network devices to the second slave server. Based on the computed times, the security server can determine a geographic location of the one of the user network devices.

In another specific implementation, a security server receives transaction information representing a transaction between a network user and a network site. The security server calculates a one-time password based on (i) the received transaction information and (ii) a secret shared by the security server and the network site, but not by the user. The one-time password is independently calculable by the network site based on the shared secret and the transaction information. The security server then transmits the calculated one-time password to a first user network device, for presentation on a window displayed by the first user network device and entry by the user onto a network page associated with the network site and displayed on a second user network device.

The security server further receives, from one of the user network devices via a network, messages of a predefined message size sent from the other of the user network devices via the one of the user network devices, and a time stamp associated with each message and corresponding to the time that each message was sent by the other of the user network devices to the one of the user network devices. The security server also receives a time stamp corresponding to the time of receipt of each message at the one of the user network devices. Similarly, the security server receives, from the other of the user network devices, the same messages sent from the one of the user network devices via the other of the user network devices, and a time stamp associated with each message and corresponding to the time that each message was sent by the one of the user network devices to the other of the user network devices. The security server also receives a time stamp corresponding to the time of receipt of each message at the other of the user network devices. Based on the time stamps, the security server can compute the time taken to communicate the messages (i) from the one of the user network devices to the other of the user network devices, and (ii) from the other of the user network devices to the one of the user network devices. Based on the computed times, the security server can determine a proximity of the two user network devices to each other.

In other embodiments, different servers may be used for the transaction security server and the geolocation/proximity master server.

It should be noted that while three separate mechanisms are described above, the user input can be minimized if desired to a single transaction confirmation.

While preferred embodiments have been described, it is to be understood that any workable combination of the techniques and features discussed above is considered to be disclosed. For example, out of band or quasi out of band transaction authentication may be practiced with geolocation, proximity determination, or both. In another example, geolocation or proximity location or both may be practiced with out of band or quasi out of band transaction authentication involving two user network devices or a single user network device. Other combinations are possible.

While a detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method, comprising:
    receiving from a web server a request for a transaction initiated at a user device;
    transmitting to the user device a one-time password derived from 1) a secret shared with the web server and not shared with the user device, and 2) details of the transaction
    receiving from one or more slave servers one or more messages originating from the user device and passing respectively through the one or more slave servers, wherein the content of the one or more messages includes or is derived from the one-time password, each of the messages indicating a time of travel of the respective message from the user device to the respective one of the slave servers; and
    based on the one or more times of travel indicated in the one or more messages, estimating a location of the user device.

2. The method of claim 1, wherein all of the steps are performed by a single master server.

3. The method of claim 1, wherein estimating the location of the user device comprises estimating an absolute geographic location of the user device.

4. The method of claim 1, wherein estimating the location of the user device comprises estimating a relative location of the user device, in relation to at least one of the slave servers.

5. The method of claim 1, wherein the one-time password is derived in part from one or more transaction details selected from the group of transaction details consisting of a type of the transaction and an amount of the transaction.

6. A method, comprising:
    receiving from a web server a request for a transaction initiated at a first user device;
    transmitting to a second user device a one-time password derived from 1) a secret shared with the web server and not shared with the second user device, and 2) details of the transaction;
    receiving from one or more slave servers a first set of one or more messages originating from the first user device and passing respectively through the one or more slave servers, wherein the content of the one or more messages includes or is derived from the one-time password, each of the messages indicating a time of travel of the respective message from the first user device to the respective one of the slave servers; and based on the one or more times of travel indicated in the first set of one or more messages, estimating a location of the first user device.

7. The method of claim 6, wherein the set of one or more messages is a first set of one or more messages, the method further comprising:
receiving from the one or more slave servers a second set of one or more messages originating from the second user device and passing respectively through the one or more slave servers, each of the messages indicating a time of travel of the respective message from the second user device to the respective one of the slave servers; and
based on the times indicated in the first and second sets of one or more messages, estimating the geographic proximity of the first and second user devices.

8. The method of claim 7, wherein all of the steps are performed by a single master server.

9. The method of claim 7, wherein the first and second user devices are reciprocal slaves.

10. The method of claim 7, wherein the content of the one or more messages in the second set includes or is derived from the one-time password.

11. The method of claim 6, wherein all of the steps are performed by a single master server.

12. The method of claim 6, wherein estimating the location of the user device comprises estimating an absolute geographic location of the user device.

13. The method of claim 6, wherein estimating the location of the user device comprises estimating a relative location of the user device, in relation to at least one of the slave servers.

14. A computerized system, comprising:
a processor; and
memory, the memory holding instructions that, when executed by the processor, cause the system to:
receive from a web server a request for a transaction initiated at a user device;
transmit to the user device or to a second user device a one-time password derived from 1) a secret shared with the web server and not shared with the second user device, and 2) details of the transaction;
receive from one or more slave servers one or more messages originating from the user device and passing respectively through the one or more slave servers, wherein the content of the one or more messages includes or is derived from the one-time password, each of the messages indicating a time of travel of the respective message from the user device to the respective one of the slave servers; and
based on the one or more times of travel indicated in the one or more messages, estimate a location of the user device.

15. The system of claim 14, wherein the instructions, when executed by the processor, cause the system to send the one-time password to the second user device.

16. The system of claim 15, wherein the set of one or more messages is a first set of one or more messages, and wherein the instructions, when executed by the processor, cause the system to:
receive from the one or more slave servers a second set of one or more messages originating from the second user device and passing respectively through the one or more slave servers, each of the messages indicating a time of travel of the respective message from the second user device to the respective one of the slave servers; and
based on the times indicated in the first and second sets of one or more messages, estimate the geographic proximity of the first and second user devices.

17. The system of claim 16, wherein the first and second user devices are reciprocal slaves.

18. The system of claim 14, wherein the instructions, when executed by the processor, cause the system to estimate an absolute geographic location of the user device.

* * * * *